(No Model.) 2 Sheets—Sheet 1.
H. JAENISCH.
CIRCLE HARROW.
No. 513,329. Patented Jan. 23, 1894.
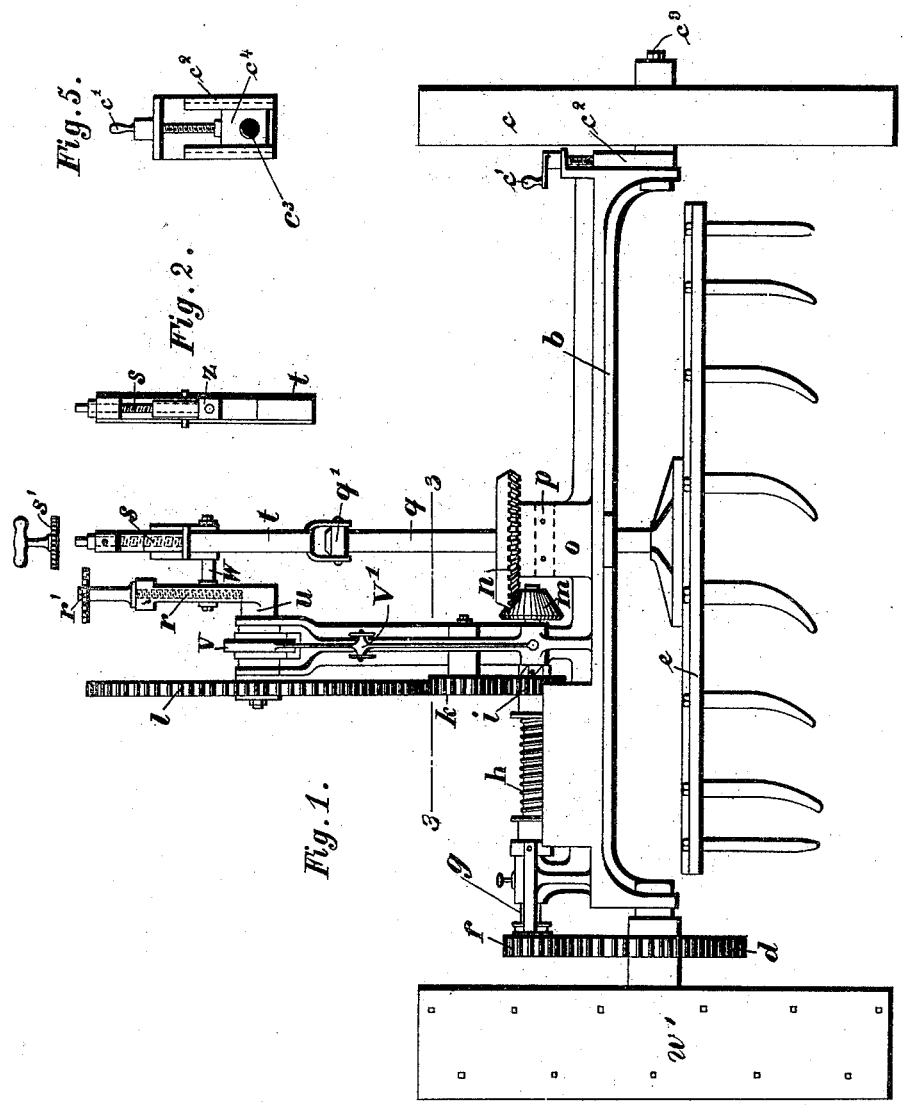
WITNESSES.
E. M. Clark
C. Sedgwick
INVENTOR:
H. Jaenisch
BY Munn & Co
ATTORNEYS (No Model.) 2 Sheets—Sheet 2.
H. JAENISCH.
CIRCLE HARROW.
No. 513,329. Patented Jan. 23, 1894.
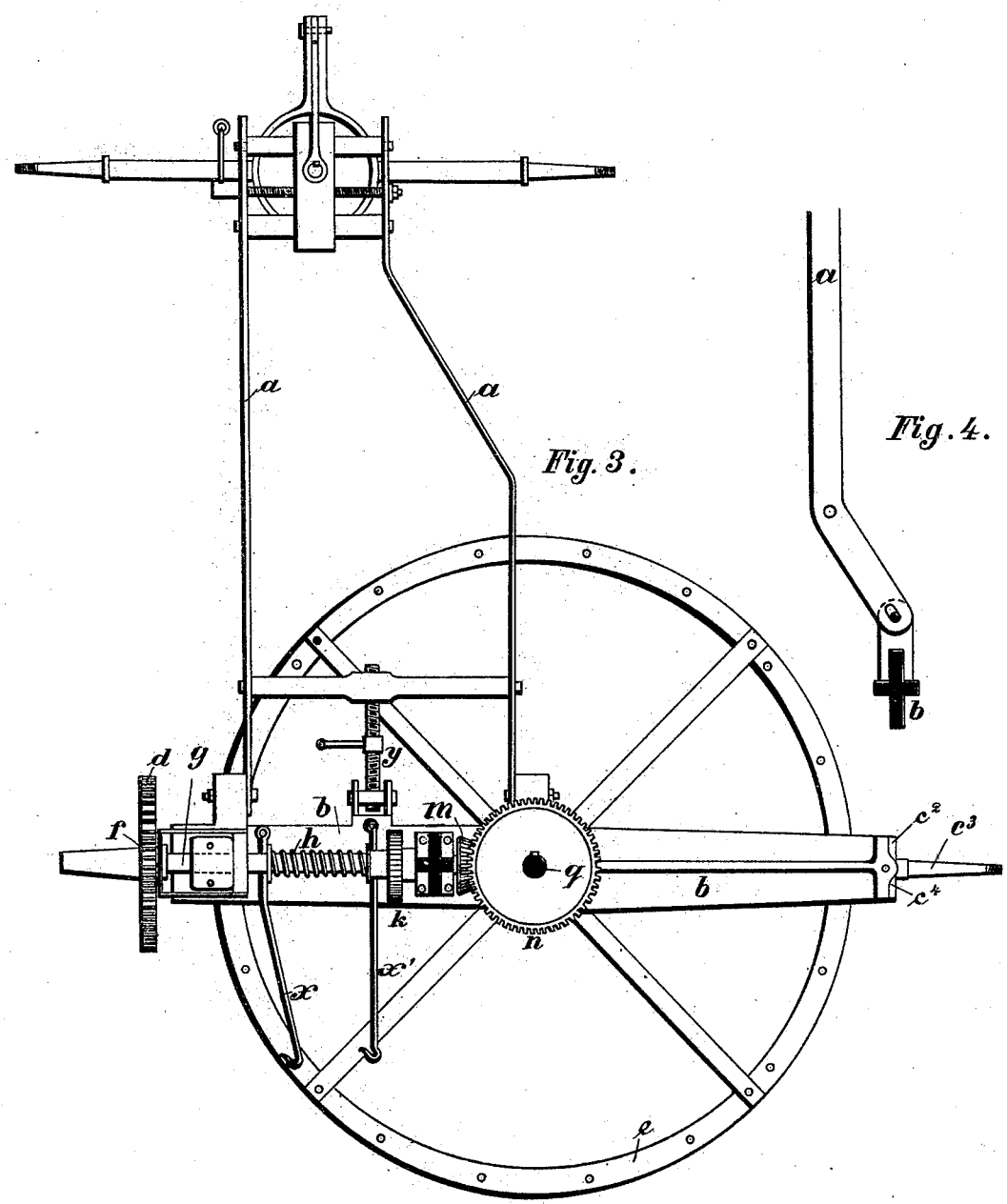
WITNESSES.
E. M. Clark
C. Sedgwick
INVENTOR:
H. Jaenisch
BY
Munn & Co
ATTORNEYS

UNITED STATES PATENT OFFICE.

HERMANN JAENISCH, OF TSCHIRNAU, NEAR GUHRAU, GERMANY.

CIRCLE HARROW.

SPECIFICATION forming part of Letters Patent No. 513,329, dated January 23, 1894.

Application filed June 29, 1893. Serial No. 479,157. (No model.)

*To all whom it may concern:*

Be it known that I, HERMANN JAENISCH, inspector, of Tschirnau, near Guhrau, in the Kingdom of Prussia and German Empire, have invented a new and useful Circle Harrow, of which the following is a specification, reference being had therein to the accompanying drawings.

The object of this invention is to effect improvements in revolving harrows; the improvements being distinguished, as compared with other devices for a similar purpose, by their easy manipulation and advantageous arrangement.

In order that my said invention may be particularly described and ascertained, reference is hereinafter made to the accompanying drawings, in which similar letters of reference indicate corresponding parts.

Figure 1 is an elevation of the invention. Fig. 2 is a detail view of a device for regulating the extent of the oscillating vertical movement of the harrow. Fig. 3 is a plan of the harrow on line 3—3 of Fig. 1. Fig. 4 is a detail view of the connection of the rear axle with the frame of the machine; and Fig. 5 is a detail view of a device for transversely inclining the said rear axle and the harrow.

The mechanism which enables the harrow to be raised and lowered, and also to be inclined relatively to the ground, is mounted upon the stationary rear crank axle $b$. The toothed wheels $d$ and $f$, the shaft $g$, and the bevel wheels $m$ and $n$ set the harrow $e$ in rotation, as soon as the rear wheel $w'$ which is firmly connected with the toothed wheel $d$ revolves when the harrow is working. The wheel $f$ can be thrown out of gear by the lever $x$, so that the rotation of the harrow may be arrested when the apparatus is traveling from place to place. The vertical rotary axle $q$ is furnished with a spring, which moves in a groove $p$ of the hub of the wheel $n$. The hub of the wheel $n$ turns in the collar bearing $o$, formed in one with the axle $b$. In consequence thereof, the harrow can be raised in a vertical direction while rotating, whenever an obstruction such as a large stone interferes with the action of the harrow, or when the latter is being transported, &c. The following parts impart this vertical motion: The axle $q$ is provided with a groove at its upper part, carrying a collar $q'$. This collar $q'$ is connected with the link $t$ by a fork, so as to form a joint. The link $t$ consists of two flat iron bars, between which is riveted a slide for a left hand screw threaded spindle, $s$ upon which the nut $z$ can be moved up and down. The nut $z$ is connected with the pin $w$. The pin $w$ is so arranged that it can be moved laterally by the right hand threaded spindle $r$. The spindle $r$ carries at one end a toothed wheel $r'$; the spindle $s$ has a quadrangular end upon which the toothed wheel $s'$ provided with a handle may be keyed, the toothed wheels $s'$ and $r'$ being then in gear, so that when the toothed wheel $s'$ is turned the pin $w$ is raised or lowered, thereby raising or lowering the harrow as required.

Upon the shaft of the crank $u$ the toothed wheel $l$ is keyed which gears with the toothed wheel $k$ arranged to turn freely on a fixed pin. The toothed wheel $k$ gears with the toothed wheel $i$ which is mounted on a sleeve upon the shaft $g$, for the purpose of being connected or disconnected to or from the toothed wheel $k$ by the aid of the lever $x'$. When the wheel $i$ is in gear, the rotation of the shaft $g$ is transmitted to the crank $u$ and the harrow $e$ is slowly raised and lowered through the medium of the pin $w$ and the oscillating link $t$, which causes the shaft $q$ to slowly reciprocate in a vertical direction.

When it is desired that the harrow should be maintained in its raised position, when it is being transported for instance, it is fixed to the crank shaft by the ratchet wheel $v$ and a pawl connected with the end of a lever $v'$, it being understood that the wheels $i$ and $k$ are out of gear at that time.

The spiral spring $h$ upon the shaft $g$, has for its object to maintain the wheels $f$ and $i$ in gear with the toothed wheels $d$ and $k$.

The arrangement serving to impart an inclination to the harrow, relatively to the ground and to the direction in which the machine is adapted to travel, is shown in Figs. 3 to 5. A screw $y$ provided with a right and a left handed screw thread (Fig. 3) is turned by a key, and thus imparts a partial rotation to the axle $b$, and an inclination to the harrow, according to the direction in which the screw $y$ is turned either toward the front end or the rear end of the machine. The connection between the rear axle b and the parts a of the frame of the apparatus is effected in the manner shown in Fig. 4. The device $c^2$ is used to give a slant position transversely to the direction in which it is being driven, this device being shown in detail in Fig. 5. The wheel c turns on the axletree $C^3$ which is secured in the axle b in such a manner as to be adjustable vertically therein. The axletree $C^3$ is furnished with a slide $C^4$ into which a thread is cut. Various positions may be given to $c^3$ relatively to b by means of a screw with a handle C', $C^4$ being held in the guides $C^2$. The harrow is thus inclined in a transverse direction relatively to the direction of driving. By combining the above described diagonal adjustments, any desired inclination may be given to the harrow, whenever it is desired to bring only one part of the harrow into action.

What I claim, and desire to secure by Letters Patent of the United States, is—

1. The combination, with the rotatable harrow, and a crank mechanism connected with the shaft thereof to alternately raise and lower the harrow, of a driving mechanism for rotating the harrow and operating the said crank mechanism, whereby the harrow will be alternately raised and lowered while it rotates, substantially as described.

2. The combination, with the rotatable harrow, and a crank mechanism connected with the shaft thereof to alternately raise and lower the harrow, of a driving mechanism for rotating the harrow and operating the said crank mechanism, whereby the harrow will be alternately raised and lowered while it rotates, the driving mechanism being capable of being thrown out of gear, and means for holding the harrow in an elevated position, substantially as described.

3. The combination, with the frame of the machine, the rotatable harrow, and the axle in which the shaft thereof is journaled, of a right and left handed screw having a connection with the frame and the axle and adapted to impart a partial rotary movement to the latter to incline the harrow longitudinally of the machine, and an adjusting device for inclining the axle with the harrow transversely of the machine whereby the harrow may be given any inclination relatively to the ground, substantially as described.

4. The combination, with the vertical bearing, the rotatable shaft capable of a sliding movement therein, and the harrow secured to the lower end of the said shaft, of a suitable gearing between one of the supporting wheels of the machine and the said shaft to impart a rotary motion to the latter, and means for imparting a reciprocating motion to the said shaft during its rotation, substantially as described.

5. The combination, with the axle of the rear wheels, the vertical bearing rigidly connected therewith, the rotatable vertical shaft capable of a sliding movement in the said bearing, and the rotatable harrow secured to the lower end of the shaft, of a suitable gearing between one of the said rear wheels and the said shaft to impart a rotary motion to the latter, means for imparting a reciprocating motion to the said shaft during its rotation, means for throwing the said rotating and reciprocating mechanisms out of gear, and means for keeping the harrow at rest in an elevated position, substantially as described.

6. The combination, with the vertical bearing, the rotatable shaft capable of a sliding movement therein, and the harrow secured to the lower end of the said shaft, of a suitable gearing between one of the supporting wheels of the machine and the said shaft to impart a rotary motion to the latter, means for imparting a reciprocating motion to the said shaft during its rotation, and means for regulating the extent of the said reciprocating motion, substantially as described.

7. The combination, with the vertical bearing, the rotatable shaft capable of a sliding movement therein, and the harrow secured to the lower end of the said shaft, of a suitable gearing between one of the supporting wheels of the machine and the said shaft to impart a rotary motion to the latter, a crank shaft and a gearing for rotating the same, a pin connected with the crank of the said crank shaft, a link connected with the pin and with the upper end of the rotatable shaft, and means for adjusting the said pin on the said crank and link, whereby an adjustable reciprocating motion can be imparted to the said shaft, substantially as described.

8. The combination, with the vertical bearing, the rotatable shaft capable of a sliding movement therein, and the harrow secured to the lower end of the said shaft, of a suitable gearing between one of the supporting wheels of the machine and the said shaft to impart a rotary motion to the latter, a crank shaft and a gearing for rotating the same, a pin connected with the crank of the said crank shaft, a link connected with the pin and with the upper end of the rotatable shaft, oppositely threaded adjusting screws mounted in the said crank and the said link to adjust the said pin thereon, and a gear between the said screws for simultaneously operating the same, whereby an adjustable reciprocating motion can be imparted to the said rotatable shaft connected with the said link, substantially as described.

9. The combination, with the axle of the rear wheels, the vertical rotatable shaft journaled in the said axle, and the harrow secured to the lower end of the said shaft, of a slide in which the axle-tree of one of the said rear wheels is journaled, guideways for the said slide secured to the said axle, and a screw for vertically displacing the said slide in the said guideways, whereby the axle and harrow can be inclined transversely of the machine, substantially as described.

10. The combination with the rotatable harrow, the supporting wheels of the machine, and a driving connection between the harrow and the wheels, of a device for inclining the harrow longitudinally of the machine, substantially as described.

11. The combination, with the axle of the supporting wheels and the rotatable harrow the shaft whereof has its bearings rigidly connected with the said axle, of an adjusting device for turning the axle to incline the shaft and the harrow longitudinally of the machine, substantially as described.

In witness whereof I hereunto set my hand in presence of two witnesses.

HERMANN JAENISCH.

Witnesses:
HEINRICH JUNGUITSCH,
EUGEN LOHR.